US008091134B2

(12) United States Patent
Benton et al.

(10) Patent No.: US 8,091,134 B2
(45) Date of Patent: Jan. 3, 2012

(54) SYSTEM AND METHOD FOR AUTONOMIC PEER-TO-PEER VIRUS INOCULATION

(75) Inventors: Farrel David Benton, Raleigh, NC (US); Shane Christopher Branch, Raleigh, NC (US); Robert J. Kapinos, Durham, NC (US); Raymond G. Octaviano, II, Marietta, GA (US); Alberto Jose Rojas Saba, Morrisville, NC (US); James C. Salembier, Cary, NC (US); Simon David Nicholas Taylor, Cary, NC (US); Sean Michael Ulrich, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 939 days.

(21) Appl. No.: 11/564,830

(22) Filed: Nov. 29, 2006

(65) Prior Publication Data

US 2008/0127347 A1 May 29, 2008

(51) Int. Cl.
*H04L 29/06* (2006.01)
(52) U.S. Cl. ............ 726/24; 726/22; 726/23; 726/3; 713/153; 713/176; 709/223; 709/224; 709/225
(58) Field of Classification Search .......... 726/2–7, 726/22–25
See application file for complete search history.

(56) References Cited

U.S. PATENT DOCUMENTS

| 5,623,600 | A  | * | 4/1997 | Ji et al. ............................ 726/24 |
| 5,960,170 | A  | * | 9/1999 | Chen et al. ....................... 714/38 |
| 6,701,440 | B1 | * | 3/2004 | Kim et al. ........................ 726/24 |
| 7,337,465 | B2 | * | 2/2008 | Kiyoto et al. ..................... 726/1 |
| 2002/0116639 | A1 | * | 8/2002 | Chefalas et al. ............... 713/201 |
| 2003/0163697 | A1 | * | 8/2003 | Pabla et al. .................... 713/171 |
| 2003/0191966 | A1 | * | 10/2003 | Gleichauf ..................... 713/201 |
| 2005/0050378 | A1 | * | 3/2005 | Liang ............................. 714/4 |
| 2005/0149749 | A1 | * | 7/2005 | Van Brabant ................. 713/200 |
| 2006/0242405 | A1 | * | 10/2006 | Gupta et al. .................. 713/156 |

OTHER PUBLICATIONS

Vlachos-V, Androutsellis-Theotokis-S, Spinellis-D, Security Applications of Peer-to-Peer networks, Jun. 5, 2004, Elsevier, Netherlands,vol. 45, No. 2, p. 195-205.*

* cited by examiner

*Primary Examiner* — Taghi Arani
*Assistant Examiner* — Amir Mehrmanesh
(74) *Attorney, Agent, or Firm* — VanLeeuwen & VanLeeuwen; Carlos Munoz-Bustamante

(57) ABSTRACT

A system, method, and program product is provided that communicates virus information between a computer that detects a virus in a file (the detecting computer system) and the computer that sent the infected file (the infected computer system). When the infected computer system sends an infected file to the detecting computer system the detecting computer system detects the virus in the infected file, retrieves virus information corresponding to the virus (such as the name of the infected file, the identifier, or name, of the virus, the virus definitions used to identify the virus, and any instructions needed to eradicate the virus), and automatically sends the virus information back to the infected computer system over the network.

20 Claims, 5 Drawing Sheets

SYSTEM AND METHOD FOR AUTONOMIC PEER-TO-PEER VIRUS INOCULATION

BACKGROUND OF THE INVENTION

1. Technical Field

The present invention relates to a system and method that inoculates a computer system against computer viruses. More particularly, the present invention relates to a system and method that uses a peer-to-peer network to inoculate a computer systems against viruses detected at another computer system.

2. Description of the Related Art

Anti-virus programs are almost a necessity when using most computer networks, such as the Internet. Most anti-virus programs use a set of virus definitions in order to analyze files and detect viruses. The virus definitions are updated as new viruses are developed and spread by malevolent individuals. The updated definitions are then able to detect and eradicate the new virus.

Currently, updates to a computer system's anti-virus definitions are propagated in a rather haphazard fashion, such as the user periodically requesting updated definitions from an anti-virus provider. These "pulls" that are requested by the user can either be scheduled pulls (e.g., every night at midnight), or interactive pulls where the updates are sent in response to a user requesting updated definitions. In addition, in many corporate environments, anti-virus definitions can be "pushed" to the client computers from a central server or other administrator computer system.

A challenge with the current environment is that an infected computer system is often unaware that it has infected files until it receives the next update to its virus definitions. Meanwhile, computer systems with updated virus definitions that receive infected files from the infected computer system have no automated means of providing the infected computer system with updated virus information and the local user of the system often does not know the origin of the infected computer file. Even when the origin of the infected file is known, the most common means of notifying the user of the infected computer system is via a telephone call or email message letting the user of the infected computer system know of the problem and suggesting that the user take steps to update their virus definitions (e.g., by requesting updated virus definitions from an anti-virus program provider).

SUMMARY

It has been discovered that the aforementioned challenges are resolved using a system, method and computer program product that communicates virus information between a computer that detects a virus in a file (the detecting computer system) and the computer that sent the infected file (the infected computer system). When the infected computer system sends an infected file to the detecting computer system the detecting computer system detects the virus in the infected file, retrieves virus information corresponding to the virus (such as the name of the infected file, the identifier, or name, of the virus, the virus definitions used to identify the virus, and any instructions needed to eradicate the virus), and automatically sends the virus information back to the infected computer system over the network.

In one embodiment, a peer-to-peer network is established between the infected computer system and the detecting computer system after the virus is detected. The infected computer system authenticates the detecting computer system before establishing the peer-to-peer network. The virus information is then transmitted over the peer-to-peer network. In an additional embodiment, the virus information is digitally signed by the detecting computer system, such as by encrypting the virus information message with a private key that corresponds to the detecting computer system. The infected computer system then authenticates the detecting computer system by decrypting the message with a public key that corresponds to the detecting computer system (e.g., a public certificate retrieved from a trusted third party).

When the infected computer system receives the virus information it updates its virus definitions using the virus definitions provided by the detecting computer system. In addition, the infected computer system uses the received virus information to eradicate the virus from the infected computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
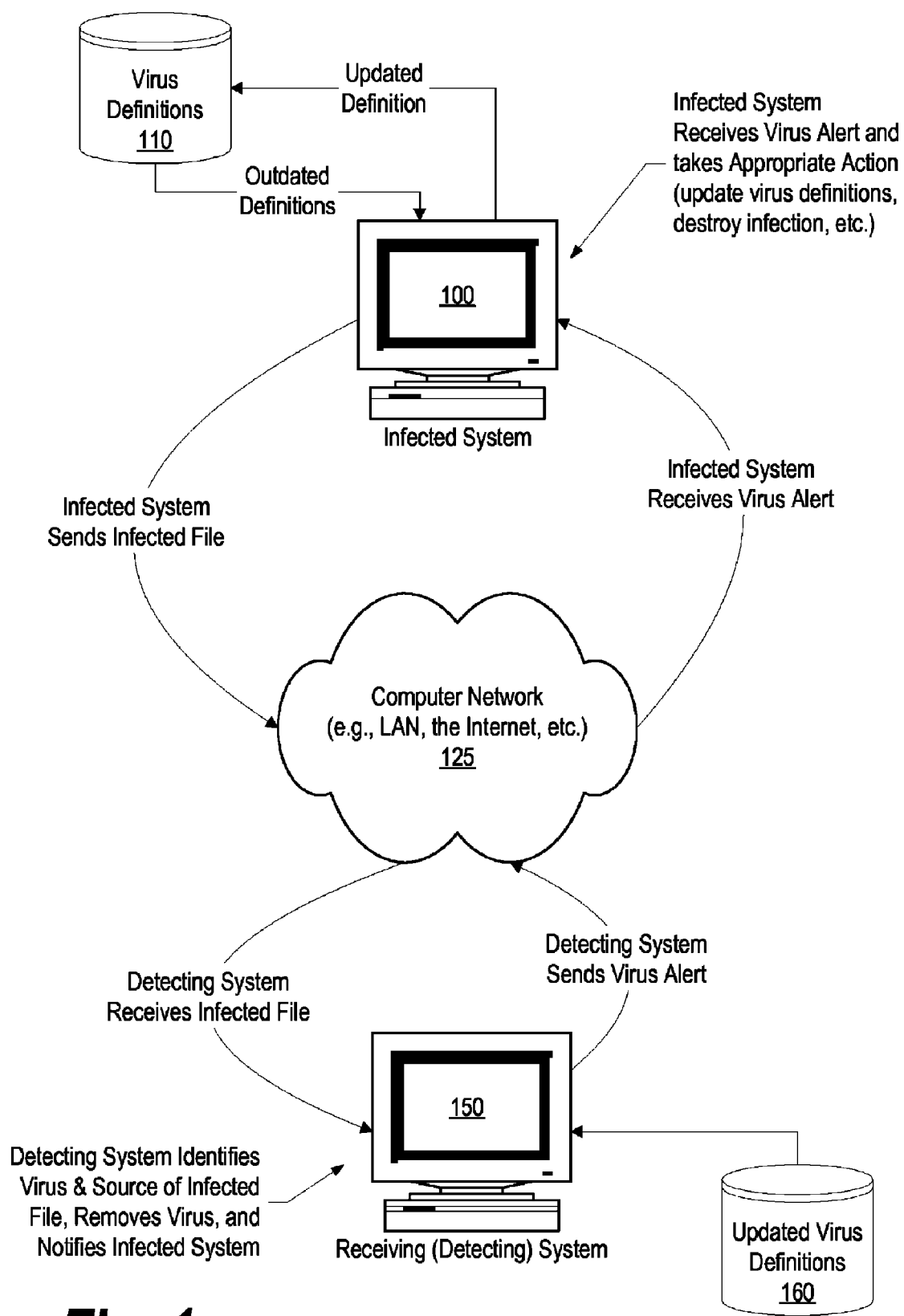
FIG. 1 is a high-level diagram showing components used in inoculating an infected system using a peer-to-peer network.

FIG. 1 is a high-level diagram showing components used in inoculating an infected system using a peer-to-peer network. Infected computer system 100 is infected with a virus. However, due to the infected computer system' outdated virus definitions 110, the virus is not detected by the infected computer system. A computer file accessible to the infected computer system is infected with the virus and the infected file is sent to another computer system over common computer network 125, such as the Internet, a Local Area Network (LAN), a Wide Area Network (WAN), a Public Switched Telephone Network (PSTN), or the like.

The receiving computer system receives the infected file. In this case, the receiving computer system is detecting computer system 150. As the name implies, detecting computer system is able to detect the virus using updated virus definitions 160. When detecting computer system 150 scans the incoming (infected) file for known viruses that match definitions stored in updated virus definitions 160, the virus is identified. In some cases, the virus can be eradicated from the infected file and stored at the detecting computer system (e.g., on the detecting computer system's nonvolatile storage device, such as a hard drive or magnetic storage drive).

Rather than simply eradicating the virus from the file received at the detecting computer system, the detecting computer system informs the infected computer system of the virus. The detecting computer system gathers virus information that include the virus definition, or definitions, that were used to identify the virus. The virus information, including the virus definitions, are then transmitted from detecting computer system 150 back to infected computer system through computer network 125. In one embodiment, a peer-to-peer network is established between the detecting and infected computer systems in order to facilitate the transfer of the virus information in a more secure fashion. When infected computer system 100 receives the virus information, it updates its virus definitions 110 with the virus definitions that were used to identify the virus. The infected computer system then scans its computer files to identify the virus that is infecting one or more files. In some cases, the virus can be eradicated from the infected files using the virus information received from the detecting computer system.

Figure 2:
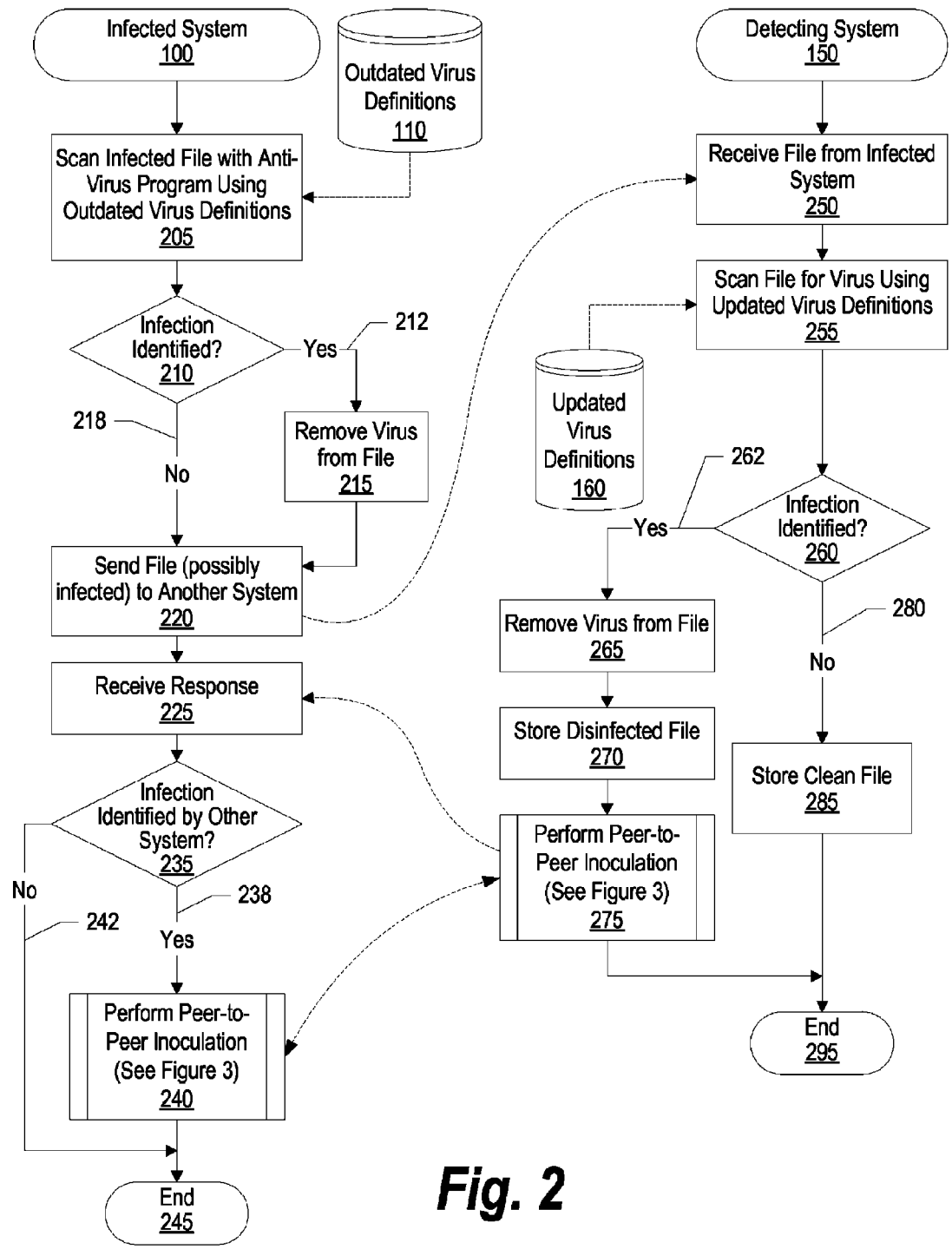
FIG. 2 is a flowchart showing the steps taken when a computer system detects a virus in a file sent by another computer system.

FIG. 2 is a flowchart showing the steps taken when a computer system detects a virus in a file sent by another computer system. Processing at the infected computer system commences at 100 whereupon, at step 205, the infected computer system scans an infected file using outdated virus definitions 110. A determination is made as to whether a virus is identified in the infected file based on the scan performed with the outdated virus definitions (decision 210). If an infection is identified, then decision 210 branches to "yes" branch 212 whereupon, at step 215, the virus is removed (i.e., eradicated) from the infected file. On the other hand, if an infection is not identified, then decision 210 branches to "no" branch 218 bypassing step 215. At step 220, the infected system sends the file to another computer system. Because the infected system's virus definitions (110) are outdated, the file may be infected by a virus that was not detected due to the outdated definitions.

Turning to processing performed by the detecting computer system, processing commences at 150 whereupon, at step 250, the file (possibly infected) that was sent by the infected computer system is received. At step 255, the detecting computer system scans the received file for viruses using updated virus definitions 160. Because the detecting computer system uses viruses that are more up-to-date than the infected computer system, it will be able to detect viruses in files that were not detected by the infected computer system. The detecting computer system makes a determination as to whether an infection is identified in the received file (decision 260). If an infection is identified, decision 260 branches to "yes" branch 262 whereupon, at step 265, the virus is removed from the file, at step 270 the disinfected file is stored in a storage area (e.g., a memory, hard drive, etc.) accessible to the detecting computer system. At predefined process 275, the detecting computer system attempts to perform a peer-to-peer inoculation of the infected computer system by notifying the infected computer system of the virus with definitions and instructions for its removal (see FIG. 3 and corresponding text for processing details). On the other hand, if an infection was not identified in the received file, then decision 260 branches to "no" branch 280 bypassing steps 265-275 and the clean (non-infected) file is stored at step 285. Detecting computer system processing thereafter ends at 295.

Returning to processing performed by the infected computer system, at step 225, the infected computer system receives a response from the detecting computer system. The response indicates whether a virus was detected in the file that the infected computer system sent at step 220. A determination is made as to whether the response indicates an infection in the file that was sent (decision 235). If an infection was detected, decision 235 branches to "yes" branch 238 whereupon, at predefined process 240, the infected computer system performs peer-to-peer inoculation procedures in order to eradicate the virus (see FIG. 3 and corresponding text for processing details). On the other hand, if the response does not indicate an infection, then decision 235 branches to "no" branch 242 bypassing predefined process 240. Infected computer system processing thereafter ends at 245.

Figure 3:
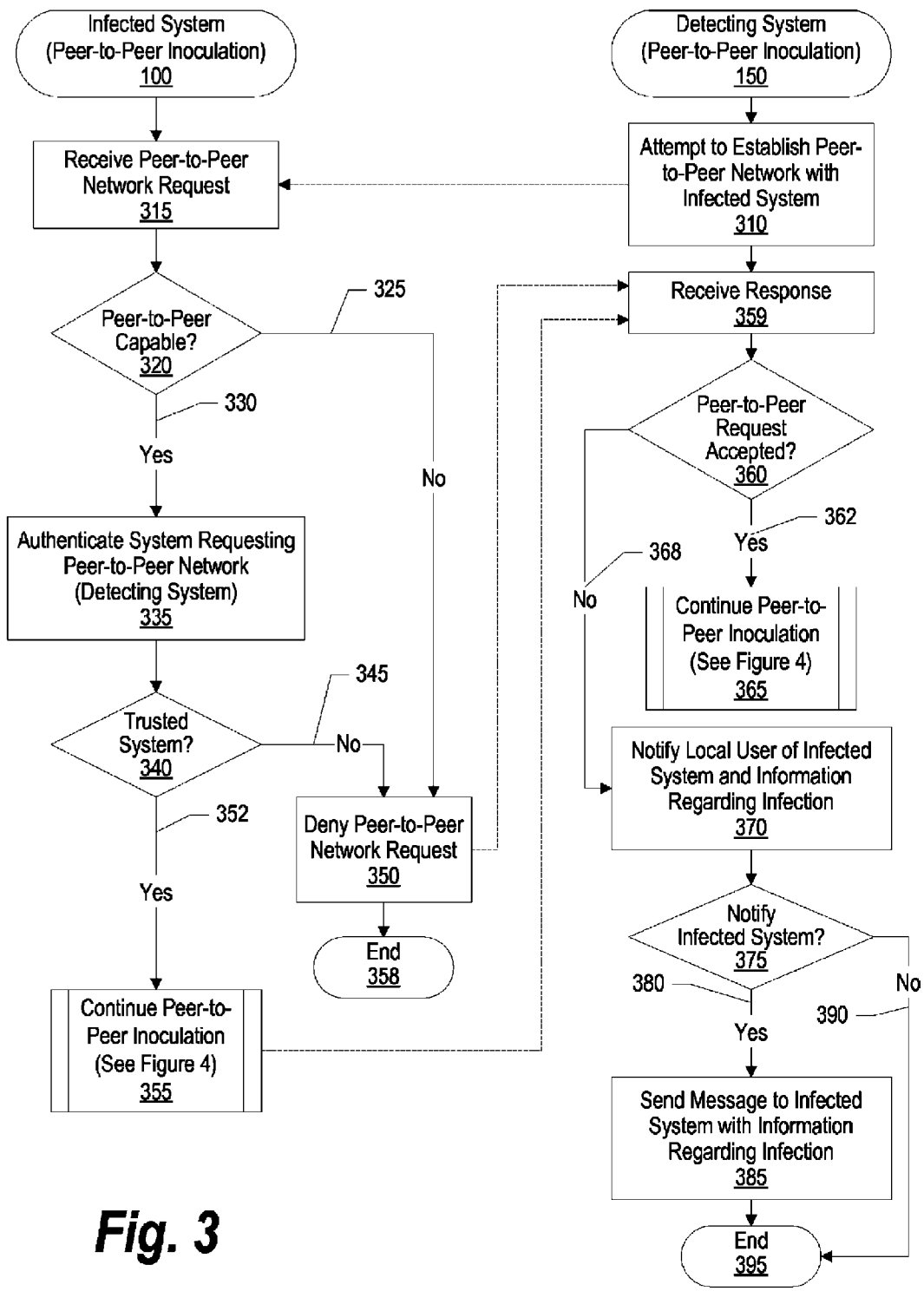
FIG. 3 is a flowchart showing the steps taken during peer-to-peer inoculation of the infected computer system.

FIG. 3 is a flowchart showing the steps taken during peer-to-peer inoculation of the infected computer system. Infected computer system processing commences at 100 and detecting computer system processing commences at 150. At step 310, after a virus has been detected in a file sent from the infected computer system to the detecting computer system, the detecting computer system attempts to establish a peer-to-peer network with the infected computer system by sending a request to the infected computer system. At step 315, the infected computer system receives the request for a peer-to-peer network. The infected computer system determines whether the infected computer system is capable of establishing a peer-to-peer (decision 320). For example, in many systems peer-to-peer networking needs to be enabled by a system administrator before a peer-to-peer session can be established. If the infected computer system is not capable of having a peer-to-peer network session, then decision 320 branches to "no" branch 325 whereupon, at step 350, the request for a peer-to-peer network is denied and processing ends at 358. On the other hand, if the infected computer system is capable of having peer-to-peer sessions, then decision 320 branches to "yes" branch 330 whereupon, at step 335, the infected computer system authenticates the detecting computer system that is requesting the peer-to-peer network (e.g., by evaluating the detecting computer system's public digital certificate stored with a trusted third party). A determination is made by the infected computer system as to whether the requesting (detecting) computer system is a trusted system (decision 340). If the requesting system is not a trusted system, then decision 340 branches to "no" branch 345 whereupon, at step 350, the request for a peer-to-peer network is denied and processing ends at 358. On the other hand, if the requesting system is a trusted computer system, then decision 340 branches to "yes" branch 352 whereupon, a predefined process 355, the peer-to-peer inoculation procedures are continued (see FIG. 4 and corresponding text for processing details).

Returning to detecting computer system processing, at step 359, the detecting computer system receives a response from the infected computer system indicating whether the request for a peer-to-peer network has been accepted. A determination is made as to whether the peer-to-peer network request was accepted (decision 360). If the peer-to-peer network request was accepted, then decision 360 branches to "yes" branch 362 whereupon, at predefined process 365, the peer-to-peer inoculation procedures are continued (see FIG. 4 and corresponding text for processing details). On the other hand, if the peer-to-peer network request was not accepted, then decision 360 branches to "no" branch 368 whereupon, at step 370, the user of the detecting computer system is notified of the infection along with details identifying the infected computer system and the infected file and virus information. The local user can use traditional means (e.g., telephone, email, etc.) to provide the information to the user of the infected computer system. A determination is made as to whether to automatically notify the infected computer system of the infection (decision 375). This decision may be based on a list of computer systems known to the detecting computer system (e.g., identified in a "white list," listed in the local user's email address book, etc.). If the detecting computer system is to automatically notify the infected computer system, then decision 375 branches to "yes" branch 380 whereupon, at step 385, the detecting computer system sends a message (e.g., an email message) to the infected computer system with information regarding the source of the infection (e.g., the filename of the infected file, the name of the virus infecting the file, the identifiers of the virus definitions used to detect the virus, information on removing the virus, etc.). On the other hand, if the detecting computer system does not automatically notify the infected computer system, then decision 375 branches to "no" branch 390 bypassing step 385. Processing performed by the detecting computer system thereafter ends at 395.

Figure 4:
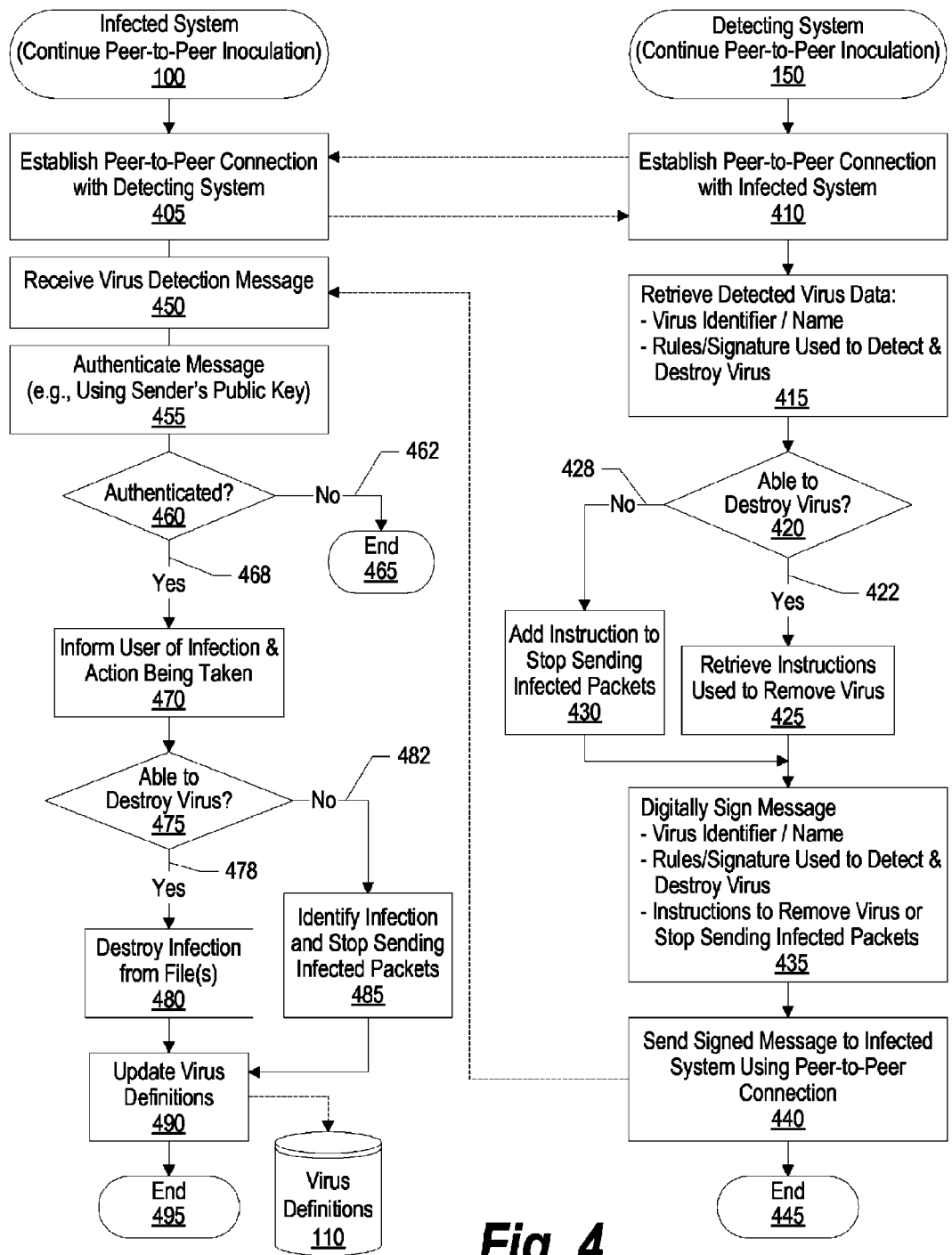
FIG. 4 is a flowchart showing further steps taken during the peer-to-peer inoculation of the infected computer system.

FIG. 4 is a flowchart showing further steps taken during the peer-to-peer inoculation of the infected computer system. Infected computer system processing commences at 100 and detecting computer system processing commences at 150. At this point, the detecting computer system has already requested a peer-to-peer network and the request has been accepted by the infected computer system, so at steps 405 and 410, a peer-to-peer network is established between the infected computer system and the detecting computer system. After the peer-to-peer network has been established, at step 415, the detecting computer system retrieves information regarding the virus that was detected in the file received from the infected computer system. This information includes the name of the infected file, the identifier (e.g., name) of the virus that was found in the infected file, and rules and/or virus definitions that were used to detect and destroy the virus. In some cases, a virus may be detected that cannot be automatically destroyed. A determination is made by the detecting computer system as to whether the virus that was detected can automatically be destroyed (decision 420). If the virus can automatically be destroyed, then decision 420 branches to "yes" branch 422 whereupon, at step 425, the detecting computer system retrieves the instructions that are used to destroy the virus from infected files. On the other hand, if the virus cannot be automatically destroyed, then decision 420 branches to "no" branch 428, whereupon, at step 430, the detecting computer system includes instructions for the infected computer system to stop sending packets (e.g., files) infected with the identified virus. At step 435, the detecting computer system digitally signs a message that includes the name of the infected file, the identifier (e.g., name) of the virus, the rules and/or virus definitions used to detect and destroy the virus, and instructions for removing the virus from infected files or instructions to stop sending packets infected with the virus. In one embodiment, the message is digitally signed using a private key that corresponds to the detecting computer system and the message is authenticated by the recipient (the infected computer system) decrypting the message using the public key that corresponds to the detecting computer system. At step 440, the detecting computer system sends the digitally signed message to the infected computer system using the peer-to-peer that was established between the computer systems. Processing by the detecting computer system thereafter ends at 445.

Turning to processing by the infected computer system, at step 450, the infected computer system receives the digitally signed message. At step 455, the infected computer system authenticates the digitally signed message (e.g., by decrypting the file using a public key assigned to the detecting computer system). A determination is made as to whether the message is authenticated (decision 460). If the message is not authenticated (e.g., an imposter signed the message), then decision 460 branches to "no" branch 462 and processing ends at 465. On the other hand, if the message is successfully authenticated, then decision 460 branches to "yes" branch 468 whereupon in one embodiment, at step 470, the local user of the infected computer system is informed that a virus was detected by the detecting computer system and actions are being taken to eradicate the virus. Based on the information received from the detecting computer system, a determination is made as to whether the virus can be automatically eradicated (decision 475). If the virus can be automatically eradicated from infected files, then decision 475 branches to "yes" branch 478 whereupon, at step 480, the virus is removed (eradicated) from infected files found on the infected computer system. On the other hand, if the virus cannot be automatically eradicated, then decision 475 branches to "no" branch 482 whereupon, at step 485, the infection is identified and the infected files are quarantined so that they are no longer transmitted to other computer systems until the virus is removed. At step 490, the infected computer system updates its virus definitions (110) using the virus definition/signature information provided by the detecting computer system. Now, if another file is received by the infected computer system with the same virus, the infected computer system's virus program will be able to identify the virus using the updated virus definitions. Processing performed by the infected computer system thereafter ends at 495.

Figure 5:
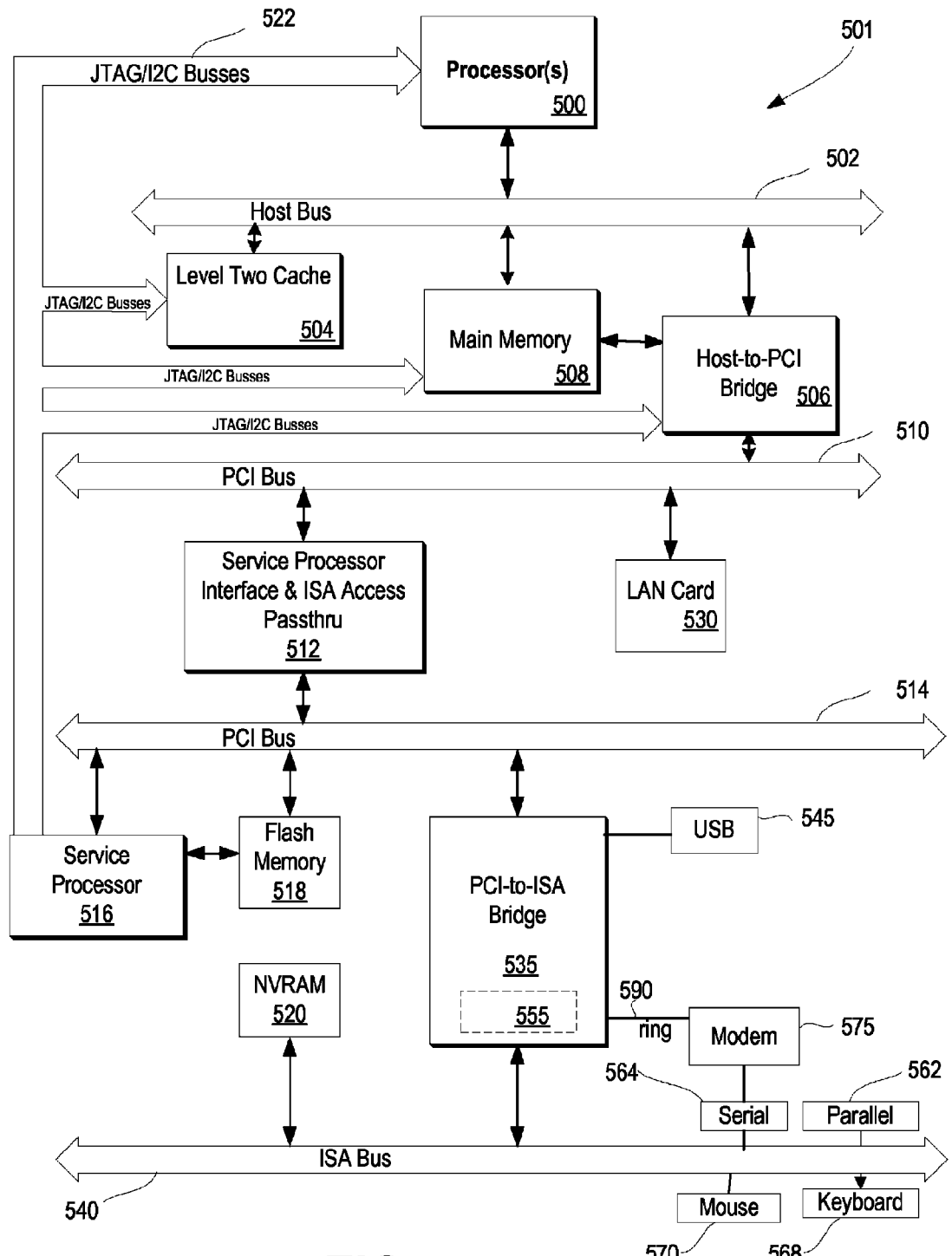
FIG. 5 is a block diagram of a data processing system in which the methods described herein can be implemented.

FIG. 5 illustrates information handling system 501 which is a simplified example of a computer system capable of performing the computing operations described herein. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While FIG. 5 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
receiving, at a detecting client computer system, a computer file from an infected client computer system, wherein the detecting client computer system and the infected client computer system are peers and connected to a common computer network, wherein neither the detecting client computer system nor the infected client computer system is a server;
scanning the received computer file at the detecting client computer system using a first plurality of virus definitions accessible to the detecting client computer system;
detecting, based on the scanning at the detecting client computer system, a virus in the received computer file;
retrieving virus information corresponding to the detected virus, wherein the virus information includes a virus definition selected from the first plurality of virus definitions;
removing, by the detecting client computer system, the virus from the received computer file using the selected virus definition, resulting in a disinfected computer file;
in response to removing the virus from the received computer file, determining, by the detecting client computer system, that the virus can automatically be removed;
in response to the determination, retrieving, by the detecting client computer system, instructions to remove the virus; and
automatically sending, by the detecting client computer system, the selected virus definition and the instructions to remove the virus to the infected client computer system over the common computer network using a peer-to-peer connection.

2. The method of claim 1 further comprising:
establishing a peer-to-peer computer network between the detecting client computer system and the infected client computer system prior to the automatic sending of the selected virus definition and the instructions to remove the virus, wherein the peer-to-peer computer network is established over the common computer network, and wherein the selected virus definition and the instructions to remove the virus are automatically sent over the established peer-to-peer network.

3. The method of claim 2 wherein the establishing further comprises:
requesting, by the detecting client computer system, the peer-to-peer network; and
receiving an acceptance of the peer-to-peer network request from the infected client computer system, wherein the acceptance of the peer-to-peer network request is in response to the detecting client computer system being a trusted computer system to the infected client computer system.

4. The method of claim 2 further comprising:
digitally signing the selected virus definition and the instructions to remove the virus at the detecting client computer system using a private encryption key corresponding to the detecting client computer system, wherein the signed selected virus definition and the instructions to remove the virus is sent to the infected client computer system over the established peer-to-peer network.

5. The method of claim 4 further comprising:
receiving the digitally signed selected virus definition and instructions to remove the virus at the infected client computer system; and
authenticating the digitally signed selected virus definition and instructions to remove the virus at the infected client computer system by using a public encryption key that corresponds to the detecting client computer system.

6. The method of claim 1 further comprising:
receiving, at the infected client computer system, the selected virus definition that was automatically sent by the detecting client computer system; and
updating a second plurality of virus definitions accessible to the infected client computer system with the selected virus definition.

7. The method of claim 1 further comprising:
receiving, at the infected client computer system, the selected virus definition and the instructions to remove the virus that was automatically sent by the detecting client computer system;
scanning a plurality of files stored at the infected client computer system using the selected virus definition and the instructions to remove the virus; and
removing the virus from one or more of the files stored at the infected client computer system in response to the scanning.

8. A information handling system comprising:
one or more processors;
a memory accessible by at least one of the processors;
a nonvolatile storage area accessible by at least one of the processors;
a network interface adapter connecting the information handling system to a computer network; and
a set of instructions stored in the memory, wherein one or more of the processors executes the set of instructions in order to perform actions of:
receiving, at the network interface adapter, a computer file from an infected client computer system, wherein the information handling system and the infected client computer system are peers and connected to the computer network, wherein neither the information handling system nor the infected client computer system is a server;
scanning the received computer file using a first plurality of virus definitions stored in the nonvolatile storage area;
detecting, based on the scanning by the information handling system, a virus in the received computer file;
retrieving virus information corresponding to the detected virus, wherein the virus information includes a virus definition selected from the first plurality of virus definitions;
removing, by the information handling system, the virus from the received computer file using the selected virus definition, resulting in a disinfected computer file;
in response to removing the virus from the received computer file, determining, by the information handling system, that the virus can automatically be removed;
in response to the determination, retrieving, by the information handling system, instructions to remove the virus; and
automatically sending the selected virus definition and the instructions to remove the virus to the infected client computer system over the common computer network via the network interface adapter using a peer-to-peer connection.

9. The information handling system of claim 8 wherein the set of instructions perform further actions comprising:
establishing a peer-to-peer computer network between the information handling system and the infected client computer system prior to the automatic sending of the selected virus definition and the instructions to remove the virus, wherein the peer-to-peer computer network is established over the common computer network, and wherein the selected virus definition and the instructions to remove the virus are automatically sent over the established peer-to-peer network.

10. The information handling system of claim 9 wherein the set of instructions that perform the establishing perform further actions comprising:
requesting, by the information handling system, the peer-to-peer network; and
receiving an acceptance of the peer-to-peer network request from the infected client computer system, wherein the acceptance of the peer-to-peer network request is in response to the information handling system being a trusted computer system to the infected client computer system.

11. The information handling system of claim 9 wherein the set of instructions perform further actions comprising:
digitally signing the selected virus definition and the instructions to remove the virus at the information handling system using a private encryption key corresponding to the information handling system, wherein the signed selected virus definition and the instructions to remove the virus is sent to the infected client computer system over the established peer-to-peer network.

12. The information handling system of claim 11 wherein the set of instructions perform further actions comprising:
receiving the digitally signed selected virus definition and instructions to remove the virus at the infected client computer system; and
authenticating the digitally signed selected virus definition and instructions to remove the virus at the infected client computer system by using a public encryption key that corresponds to the information handling system.

13. The information handling system of claim 8 wherein the set of instructions perform further actions comprising:
receiving, at the infected client computer system, the selected virus definition and the instructions to remove the virus that was automatically sent by the information handling system;
updating a second plurality of virus definitions accessible to the infected client computer system with the selected virus definition;
scanning a plurality of files stored at the infected client computer system using the virus definition and the instructions to remove the virus; and
removing the virus from one or more of the files stored at the infected client computer system in response to the scanning.

14. A computer program product stored in a non-transitory computer readable medium, comprising functional descriptive material that, when executed by a data processing system, causes the data processing system to perform actions that include:
receiving, at a detecting client computer system, a computer file from an infected client computer system, wherein the detecting client computer system and the infected client computer system are connected to a common computer network, wherein neither the detecting client computer system nor the infected client computer system is a server;

scanning the received computer file at the detecting client computer system using a first plurality of virus definitions accessible to the detecting client computer system;

detecting, based on the scanning at the detecting client computer system, a virus in the received computer file;

retrieving virus information corresponding to the detected virus, wherein the virus information includes a virus definition selected from the first plurality of virus definitions;

removing, by the detecting client computer system, the virus from the received computer file using the selected virus definition, resulting in a disinfected computer file;

in response to removing the virus from the received computer file, determining, by the detecting client computer system, that the virus can automatically be removed;

in response to the determination, retrieving, by the detecting client computer system, instructions to remove the virus; and automatically sending, by the detecting client computer system, the selected virus definition and the instructions to remove the virus to the infected client computer system over the common computer network using a peer-to-peer connection.

15. The computer program product of claim 14 wherein the functional descriptive material causes the data processing system to perform further actions comprising:

establishing a peer-to-peer computer network between the detecting client computer system and the infected client computer system prior to the automatic sending of selected virus definition and the instructions to remove the virus, wherein the peer-to-peer computer network is established over the common computer network, and wherein the selected virus definition and the instructions to remove the virus are automatically sent over the established peer-to-peer network.

16. The computer program product of claim 15 wherein the establishing further comprises wherein the functional descriptive material causes the data processing system to perform further actions comprising:

requesting, by the detecting client computer system, the peer-to-peer network; and receiving an acceptance of the peer-to-peer network request from the infected client computer system, wherein the acceptance of the peer-to-peer network request is in response to the detecting client computer system being a trusted computer system to the infected client computer system.

17. The computer program product of claim 15 wherein the functional descriptive material causes the data processing system to perform further actions comprising:

digitally signing the selected virus definition and the instructions to remove the virus at the detecting client computer system using a private encryption key corresponding to the detecting client computer system, wherein the signed selected virus definition and the instructions to remove the virus is sent to the infected client computer system over the established peer-to-peer network.

18. The computer program product of claim 17 wherein the functional descriptive material causes the data processing system to perform further actions comprising:

receiving the digitally signed selected virus definition and instructions to remove the virus at the infected client computer system; and authenticating the digitally signed selected virus definition and instructions to remove the virus at the infected client computer system by using a public encryption key that corresponds to the detecting client computer system.

19. The computer program product of claim 14 wherein the functional descriptive material causes the data processing system to perform further actions comprising:

receiving, at the infected client computer system, the selected virus definition that was automatically sent by the detecting client computer system; and updating a second plurality of virus definitions accessible to the infected client computer system with the selected virus definition.

20. The computer program product of claim 14 wherein the functional descriptive material causes the data processing system to perform further actions comprising:

receiving, at the infected client computer system, the selected virus definition and the instructions to remove the virus that was automatically sent by the detecting client computer system;

scanning a plurality of files stored at the infected client computer system using the selected virus definition and the instructions to remove the virus; and removing the virus from one or more of the files stored at the infected client computer system in response to the scanning.

* * * * *